United States Patent [19]

Haugwitz

[11] Patent Number: 4,533,264
[45] Date of Patent: Aug. 6, 1985

[54] HOUSING FOR ROLLER BEARINGS WITH LUBRICATING MEANS

[75] Inventor: Werner Haugwitz, Schweinfurt, Fed. Rep. of Germany

[73] Assignee: SKF Kugellagerfabriken GmbH, Schweinfurt, Fed. Rep. of Germany

[21] Appl. No.: 524,086

[22] Filed: Aug. 17, 1983

[30] Foreign Application Priority Data

Aug. 20, 1982 [DE] Fed. Rep. of Germany ....... 3231005

[51] Int. Cl.³ .............................................. F16C 33/66
[52] U.S. Cl. ...................................... 384/472; 384/406
[58] Field of Search ............... 308/187, 189 R, 207 R, 308/245, 85 R, 85 A, 85 B; 384/322, 397, 398, 401, 403–406; 184/11.5

[56] References Cited

U.S. PATENT DOCUMENTS

| | | | |
|---|---|---|---|
| 1,313,736 | 8/1919 | Rice | 384/406 |
| 1,908,379 | 5/1933 | Todd | 308/187 |
| 2,239,283 | 4/1941 | Brown | 308/187 |
| 2,404,429 | 7/1946 | Brittain | 308/85 R X |
| 2,445,432 | 7/1948 | Hodell | 384/406 |

Primary Examiner—Stuart S. Levy
Assistant Examiner—David Werner
Attorney, Agent, or Firm—Eugene E. Renz, Jr.

[57] ABSTRACT

A housing (1, 2) for roller bearings (10) with lubrication means in the form of a lubricator ring (13) which partially runs into an oil storage space (17) arranged underneath the shaft (6) and rests on the shaft (6) or the like which drives the lubricator ring (13), has on one side of the roller bearing (10) a dividing wall (4) running at a distant from it arranged radial to the bearing axis for separating a space (12) occupying the roller bearing (10) from an outer space (11) containing the oil storage space (17). The lubricator ring (13) is arranged in an upper area in the space (19) for the roller bearing (10).

In order to provide a reliable housing, the fabrication and assembly of which in comparison with the known housings is simplified, whereby further the possibility for a good seal should exist between the space occupying the roller bearing and the outer space containing the oil storage space, the dividing wall (4) as well as an outer limiting wall (17a) of the outer space (11) containing the oil storage space (17) each are constructed in one piece with the housing (1, 2). When the dividing wall (11) has a bore (15) for receiving the shaft (6) and running concentric to the bearing axis, a ring (8) arranged on the shaft (6) or the like engages in it for the purpose of good sealing with little play.

5 Claims, 3 Drawing Figures

HOUSING FOR ROLLER BEARINGS WITH LUBRICATING MEANS

BACKGROUND OF THE INVENTION

I. Field of the Invention

The present invention relates to pillow blocks generally. More specifically, the invention relates to a housing for rolling bearings incorporating lubrication means in the form of a lubricator ring which extends between a lubricant sump located underneath a shaft rotatably mounted in the housing and is rotated by the shaft to convey lubricant to an upper area in the housing to a space or chamber for the rolling bearing. The housing is provided with a plurality of walls extending radially to the bearing axis to defining a central chamber for the rolling bearing and outer chambers defining lubricant storage spaces.

II. Description of the Prior Art

A typical prior art pillow block housing is shown in French Pat. No. 14 24 461. In accordance with this prior pillow block housing construction, the dividing wall separating the space for the rolling bearing from an outer lubricant storage space is formed as a separate cover connected to the housing by means of screw members or the like. Additionally, the outer limiting wall of the lubricant storage space is constructed as a separate part. By reason of this construction, fabrication and assembly of this prior known pillow block housing are particularly expensive.

SUMMARY OF THE INVENTION

With the foregoing in mind, it is an object of the present invention to provide a pillow block housing characterized by novel features of the construction and arrangement which is of comparatively simplified design, is easy and economical to manufacture and assemble and which includes a novel seal arrangement between the space for the rolling bearing and the lubricant space and a novel lubricator ring means for effecting lubrication of the rolling bearing in operation. To this end, the pillow block housing comprises upper and lower housing sections, having a bore therebetween for rotatably mounting a shaft therein and a series of wall sections running generally radially to the bearing axis defining a central chamber for the rolling bearing and at least one outer chamber for lubricant and wherein a lubricating ring having a portion communicating with the rolling bearing chamber and the lubricant chamber conveys lubricant upon rotation of the shaft member to from the lubricant chamber to the rolling bearing chamber to lubricate the bearing and wherein the pillow block housing sections and dividing walls are of integral unitary, one piece construction. More specifically, the dividing wall has a bore concentric to the bearing axis and the shaft member is provided with an annular ring like projection which engages with minimal play in the concentric bore. This provides an especially good seal particularly for rolling bearings operating at high speed since the seal according to the present invention is a non-contacting seal. Further the seal is effective in preventing leakage of lubricant from the bearing space as well as ingress of dirt or foreign matter into the bearing chamber and therefore, a high degree of reliability of the bearing is guaranteed even over long maintenance periods. It is noted that the particular arrangement of the seal and dividing walls in the housing provides an inactive zone on either side of the sealed bearing chamber.

The pillow block housing of the present invention has particular application for use with high speed mine fans, induced draft and fresh air blowers, impact pulverizers and heater mills notwithstanding the fact that in some of these applications a one sided suction or pressure exists adjacent one end of the housing which has a tendency to pull air through the housing or allow oil vapor to escape.

In accordance with another feature of the invention, an annular ring on the shaft member may be provided at its outer peripheral surface with one or more annular grooves and the bore of the dividing wall is provided with a plurality of circumferentially extending projections which nest and engage in the grooves with a certain amount of play to further enhance the seal at this juncture. This provides an additional labyrinth seal at the dividing wall. Additionally, labyrinth seals may be provided adjacent the outer axial end walls of the housing defining the outer confines of the lubricant storage chamber so that the oil storage space forms an especially effective inactive zone.

Preferably, the ring or annular member can be formed integrally as one piece with a bearing spacer or the like to simplify fabrication and assembly of the overall pillow block housing.

In accordance with another feature of the present invention, the radial wall sections dividing the interior of the pillow block housing into an interior central chamber for the rolling bearing may be arranged to have symmetrical outer lubricant chambers which are interconnected by air passages to thereby equalize pressure distribution in the chambers.

The pillow block housing preferably is divided into upper and lower housing sections to provide a more simplified construction and easy accessibility. In this manner, the entire bearing may be inspected simply by removing the upper housing section and without draining lubricant since the lubricant storage sections are in the lower part of the housing.

BRIEF DESCRIPTION OF THE DRAWINGS

These and other objects of the present invention and the various features and details of the operation and construction of a pillow block housing in accordance with the present invention are hereinafter more fully set forth with reference to the accompanying drawings, wherein.

DESCRIPTION OF THE PREFERRED EMBODIMENT

Figure 1:
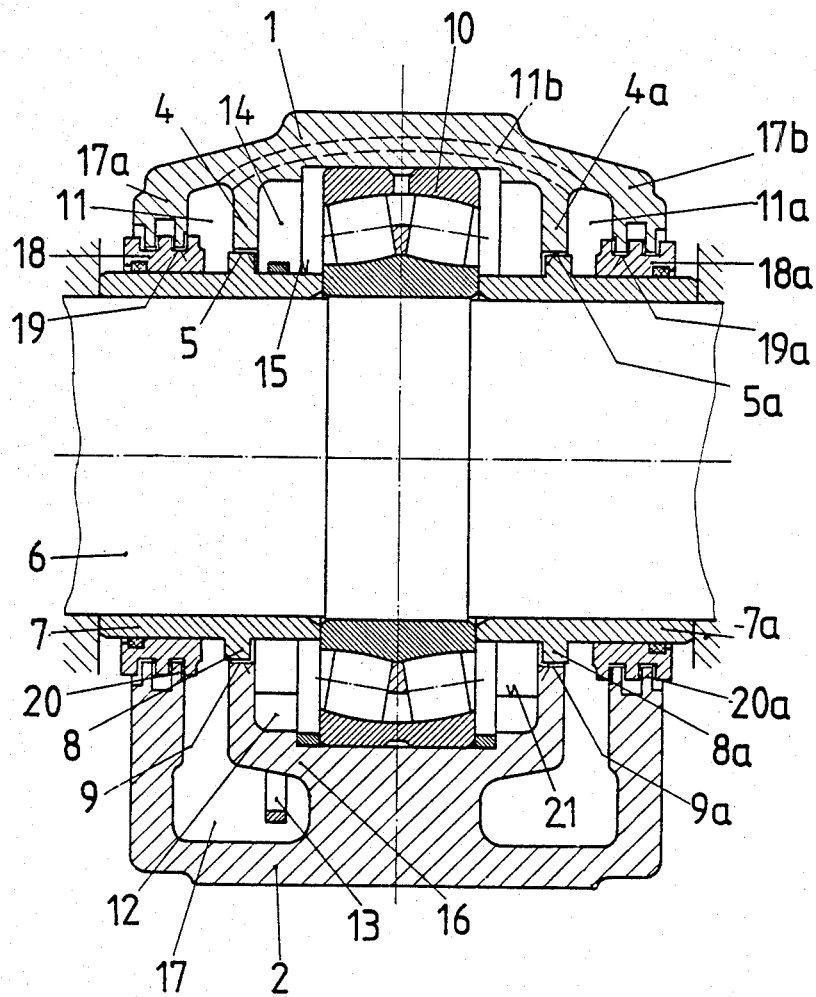
FIG. 1 is a longitudinal sectional view of a pillow block housing with a bearing lubrication system in accordance with the present invention.
Figure 3:
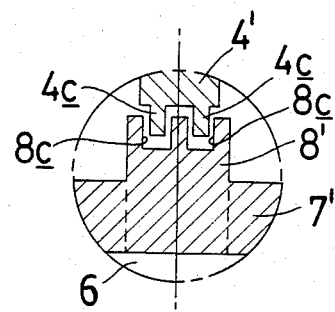
FIG. 3 is an exploded fragmentary view showing an alternate seal arrangement for the interior walls of the pillow block.
Figure 2:
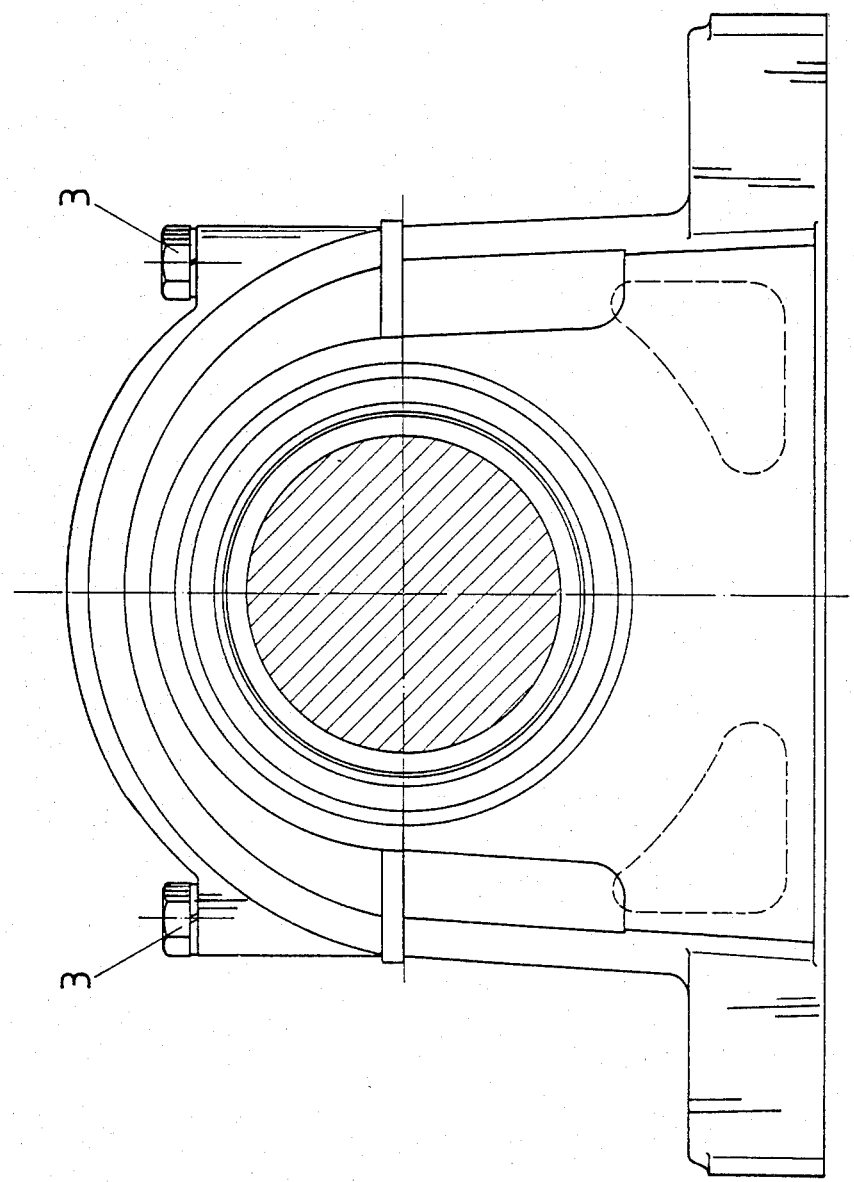
FIG. 2 shows an end elevational view of the pillow housing of FIG. 1.

Referring now to the drawings and particularly to FIG. 1 thereof, the pillow block housing comprises upper and lower sections 1 and 2 respectively which as illustrated in FIG. 2 may be secured in assembled relation by means of bolts 3. The interior of the housing is hollow and has two axially spaced radially directed inner dividing walls 4, 4a in the present instance, formed integrally with the housing sections, the inner peripheral surface of the dividing walls difining a bore, 5, 5a, disposed concentric to the bearing axis. Annular ring members 8, 8a in the present instance formed integrally with bearing spacers 7, 7a mounted on a shaft 6 on opposite sides of the rolling bearing assembly 10 engaged in the bores 5, 5a with little play so that clearance seals 9, 9a are formed which are effective in keeping dust and foreign particles from entering into the bearing chamber. The interior of the housing is therefore, divided by the radial walls 4, 4a into three spaces or chambers designated by the numerals 11, 11a, and 12. The outer chambers or spaces 11, 11a serve as storage means for a lubricant and are interconnected by air passages 11b so that even with different pressure conditions on both sides of the housing, the pressure balances in the chambers 11 and 11a via the connecting passage 11b.

As illustrated in FIG. 1, a rolling bearing, in the present instance, a self aligning roller bearing 10 is mounted in the central chamber 12 and a lubricator ring 3 is provided which communicates with a chamber 14 to one side of the bearing and the lubricant sump 17 via openings (not shown) in the central part of the housing. The lubricant ring 13 engages the bearing spacer 7 and upon rotation of the spacer and shaft draws lubricant from the sump into the annular chamber 14. The lubricator ring 13 is enclosed in the chamber like section 14 in the upper area of the housing 1, 2 so that it is fixed in its position and resists displacement The lubricant level in the inner space 12 is controlled by an overflow 21 suitably connected with the lubricant sump 17.

The housing sections 1 and 2 are sealed to the outside by means of annular sealing rings 18, 18a which seat on the outer terminal ends of the bearing spacer 7, 7a. These annular ring members 18, 18a are provided with a series of annular grooves 19, 19a on their outer periphery to receive circumferentially extending projections 20, 20a formed integrally with the outer walls 17a and 17b of the housing. This arrangement defines a labyrinth seal.

Even though a specific embodiment of bearing housing 12 incorporating lubrication means according to the present invention has been illustrated and described herein, modifications and changes may be made therein within the scope of the following claims. For example, the annular ring members 8, 8a may be formed as separate rings instead of being formed integrally with the bearing spacer 7, 7a. It is further possible to provide one or more annular grooves 8c in the outer peripheral surface of the rings 8' into which circumferentially extending projections 4c in the bore 5, 5a of the dividing wall 4' project. This arrangement provides an improved seal between the spaces 11, 11a and 12.

I claim:

1. A housing (1,2) for rolling bearings incorporating a lubricating ring (13) which extends continuously between a lubricant storage chamber (17) beneath a shaft (6) and is driven by the shaft (6) to convey lubricant for lubricating a bearing (10), said housing (1,2) including a pair of dividing walls (4,4a) located on either side of the bearing extending radially relative to the bearing axis thereby defining a separate chamber (12) for the rolling bearing and chambers (11,11a) spaced axially outwardly of the bearing chamber (12), one of said dividing walls (4) and an outer wall (17a) of the housing defining the lubricant chamber (17), said one of said dividing walls being constructed integrally as one piece with the housing, and at one side of the roller bearing (10) located opposite an outer space containing the lubricant chamber (17), the other of said dividing walls (4a) arranged at a distance from the roller bearing (10) which together with an outer limiting wall (17b) at that location of the housing (1, 2) forms an outer space (11a) corresponding to the outer space (11) containing the lubricant chamber.

2. A housing as claimed in claim 1 wherein said outer spaces (11, 11a) are interconnected by air passages (11b).

3. A housing as claimed in claim 1 wherein a ring on the shaft (8) is formed in one piece with a bearing spacer (7).

4. A housing as claimed in claim 1 wherein a ring (8) is arranged on the shaft (6) and is provided with at least one annular groove at its outer periphery into which circumferentially extending projections engage with play in the bore (5) of the dividing walls (4).

5. A housing as claimed in claim 1 including a ring (8) arranged on the shaft (6) which engages with little play in a concentric bore (5) in the dividing walls to define noncontacting seal means between said lubricant chamber (17) and said bearing chamber (12).

* * * * *